(12) United States Patent
Juenemann et al.

(10) Patent No.: US 11,318,714 B2
(45) Date of Patent: *May 3, 2022

(54) LIGHT-PERMEABLE MULTI-LAYER COMPOSITE FILM

(71) Applicant: Benecke-Kaliko AG, Hannover (DE)

(72) Inventors: Jens Juenemann, Suterode (DE); Kristina Hahn, Hannover (DE)

(73) Assignee: Benecke-Kaliko AG, Hannover (DE)

( * ) Notice: Subject to any disclaimer, the term of this patent is extended or adjusted under 35 U.S.C. 154(b) by 66 days.

This patent is subject to a terminal disclaimer.

(21) Appl. No.: 16/642,938

(22) PCT Filed: Jun. 12, 2018

(86) PCT No.: PCT/EP2018/065421
§ 371 (c)(1),
(2) Date: Feb. 28, 2020

(87) PCT Pub. No.: WO2010/042611
PCT Pub. Date: Mar. 7, 2017

(65) Prior Publication Data
US 2020/0346431 A1    Nov. 5, 2020

(30) Foreign Application Priority Data
Sep. 1, 2017   (DE) ............... 10 2017 215 367.9

(51) Int. Cl.
*B32B 27/08*   (2006.01)
*B32B 7/023*   (2019.01)
(Continued)

(52) U.S. Cl.
CPC ............. *B32B 7/023* (2019.01); *B32B 3/263* (2013.01); *B32B 3/266* (2013.01); *B32B 3/30* (2013.01);
(Continued)

(58) Field of Classification Search
CPC ........ A47B 2220/0077; B32B 2255/10; B32B 2255/26; B32B 2266/0235;
(Continued)

(56) References Cited

U.S. PATENT DOCUMENTS

| 5,601,928 A | 2/1997 | Katayama et al. |
| 2011/0227240 A1 | 9/2011 | Sostmann et al. |
| 2014/0211498 A1 | 7/2014 | Cannon et al. |

FOREIGN PATENT DOCUMENTS

| CA | 2454911 A1 | 2/2003 |
| CN | 1097252 C | 12/2002 |

(Continued)

OTHER PUBLICATIONS

International Search Report dated Jul. 27, 2018 of International Application PCT/EP2018/065421 on which this application is based.

(Continued)

*Primary Examiner* — Lawrence D Ferguson
(74) *Attorney, Agent, or Firm* — David L. Cate; Gregory Adams

(57) ABSTRACT

Light-permeable multilayer composite film made of plastic as the surface coating of an article, wherein the composite film comprises at least one outer, at least partially light-permeable top layer optionally provided with a lacquer and at least one further layer arranged on the back of the top layer, wherein arranged on the back side of the top layer is an optical layer, preferably an optical layer made of polyethylene terephthalate (PET) which has light-transmitting, light-refracting and light-reflecting properties or a combination thereof, wherein the transmission, refraction and reflection properties are such that illumination of the optical layer, in particular back side illumination of the optical layer, results in preferably uniform light transmission through the top layer.

9 Claims, 2 Drawing Sheets

1,3

Figure 1:
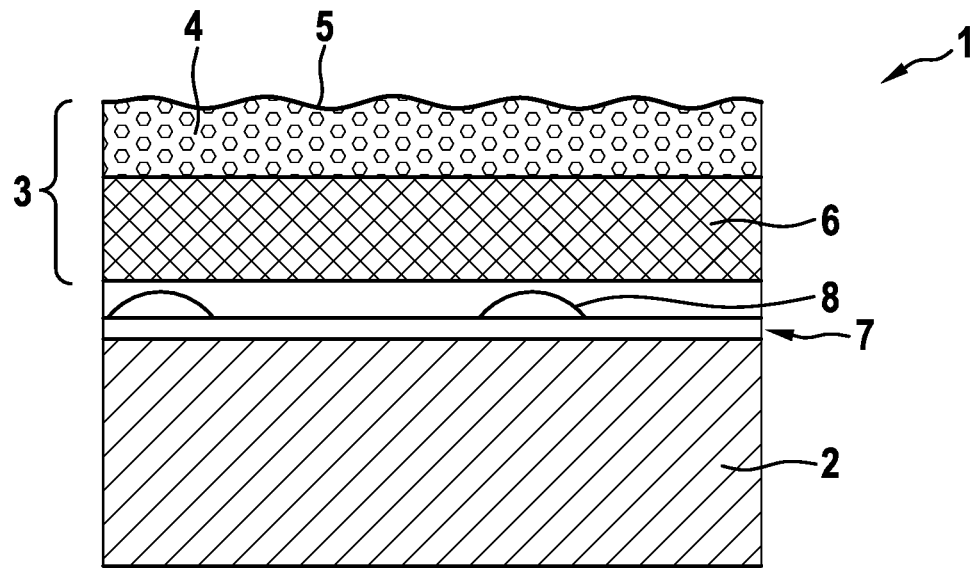

(51) Int. Cl.
  *B60Q 3/54* (2017.01)
  *B32B 3/26* (2006.01)
  *B32B 3/30* (2006.01)
  *B32B 27/32* (2006.01)
  *B32B 27/36* (2006.01)
  *B60R 13/02* (2006.01)

(52) U.S. Cl.
  CPC .............. *B32B 27/08* (2013.01); *B32B 27/32* (2013.01); *B32B 27/36* (2013.01); *B60Q 3/54* (2017.02); *B60R 13/02* (2013.01); *B32B 2255/10* (2013.01); *B32B 2255/26* (2013.01); *B32B 2266/0235* (2013.01); *B32B 2274/00* (2013.01); *B32B 2307/41* (2013.01); *B32B 2307/412* (2013.01); *B32B 2307/416* (2013.01); *B32B 2307/418* (2013.01); *B32B 2451/00* (2013.01); *B32B 2479/00* (2013.01); *B32B 2605/003* (2013.01); *B60R 2013/0287* (2013.01)

(58) Field of Classification Search
  CPC ............ B32B 2274/00; B32B 2307/41; B32B 2307/412; B32B 2307/416; B32B 2307/418; B32B 2451/00; B32B 2479/00; B32B 2605/003; B32B 2605/006; B32B 27/065; B32B 27/08; B32B 27/16; B32B 27/304; B32B 27/32; B32B 27/36; B32B 3/085; B32B 3/263; B32B 3/266; B32B 3/30; B32B 5/18; B32B 7/02; B32B 7/023; B60Q 2500/10; B60Q 3/54; B60Q 3/745; B60R 13/02; B60R 2013/0287
  See application file for complete search history.

(56) References Cited

FOREIGN PATENT DOCUMENTS

| | | |
|---|---|---|
| DE | 102005038680 A1 | 2/2006 |
| DE | 102008045015 A1 | 3/2010 |
| EP | 0648610 A1 | 4/1995 |
| EP | 2233366 A1 | 9/2010 |
| EP | 2520195 A1 | 11/2012 |
| EP | 2762362 A1 | 8/2014 |
| KR | 20170040460 A | 4/2017 |

OTHER PUBLICATIONS

Gang Wei etc. / Plastic molding theory and technology foundation, 2013—Cited in NPL No. 3.
Jun Wei etc. / Polymer synthesis technology, 2011—Cited in NPL No. 3.
Part of CN office action 201880056229.3 dated Dec. 14, 2021 (foreign counterpart of this U.S. application).

LIGHT-PERMEABLE MULTI-LAYER COMPOSITE FILM

The invention relates to a light-permeable multilayer composite film made of plastic as the surface coating of an article, wherein the composite film comprises at least one outer, at least partially light-permeable/transparent top layer optionally provided with a lacquer and at least one layer arranged on the back of the top layer.

Films in the form of multilayer composite films for coating and as surfaces of all manner of articles are well known in the prior art, for instance in the surface finish of furniture and interior trim pieces of vehicles, in particular of motor vehicles. In the case of the latter, flexible, grained, patterned or finely structured plastic skins are used as surfaces for interior trim, often as relatively soft foam-backed films having pleasant haptics, for instance for trimming dashboards or interior door panels etc. With appropriate adaptation for strength and design such films are of course also utilized for other high-quality coated products.

Films for the interior trim of motor vehicles, for furniture, bags etc., commonly also referred to as imitation leather, often have a multi-layered structure, are often foam-backed and show three-dimensionally structured surfaces having a wide variety of shapes and configurations on their top side. The multi-layered structure generally consists of an upper top layer or decorative layer, which is provided with the embossed or impressed surface, and one or more lower layers. The top layer is generally provided with a coating layer and may also be colored. Formulating the layers appropriately, including by adapting softness or using the abovementioned foamed layers, results in appealing haptics, i.e. a pleasingly "soft" feel of the plastic film and also a certain gloss.

The prior art discloses various processes for producing such plastic skins, for example rolling and/or embossing processes for producing "endless" film webs made of thermoplastic material or processes for producing individual molded skins, i.e. plastic moldings.

The ever-increasing demand for comfort features for example in the field of vehicle equipment has the result not only in these fields that there is a desire for ever increasing individualization of articles and the integration of functions into everyday articles and their surfaces is today also being brought to the attention of the customer.

Staying with vehicles, covering materials/flexible surface materials are thus now being incorporated into the control systems of motor vehicles as functional or sensor or signalling elements.

With respect to the integration of illumination elements or indicator lights into surface layers it has also been proposed to attach electroluminescent elements or layers into or onto components and trim pieces for the interior of motor vehicles.

Thus CA 2 454 911 A1 discloses a vehicle headlining as a molding provided with strip-like electroluminescent elements. The vehicle headlining in this case consists of a molded carrier that is pressed with a coating film to afford a component. Electroluminescent elements are thereby initially positioned in the carrier, passed through the carrier with their connection cables and then covered, fixed and compressed with the applied coating film. The disadvantage here, however, is the relatively complicated design. In addition, the electroluminescent elements behind the decorative surface/coating film may also become visible as bulges in this embodiment.

DE 10 2005 038 680 A1 discloses a component of a motor vehicle having a three-dimensional surface which comprises an electroluminescent layer and is film-insert molded with thermoplastic material to fix the component shape. This method is thus essentially used to produce relatively small, non-flexible lighting elements, for example illuminated switches or illuminating elements. The production of larger parts is rather difficult with this embodiment.

DE 10 2008 045 015 A1 discloses a process for producing a molded skin comprising an embedded sheetlike electroluminescent element, wherein an outer functional or carrier layer of the electroluminescent element is produced from plastic material which is substantially identical to the pulverulent plastic material of the molded skin and is applied to the not yet completely hardened and cooled molded skin. Here too, the production of relatively large parts is is difficult irrespective of the fact that endless production of rolls of material for coating in a cost-effective rolling or calendering process for example is impossible.

The problem addressed by the present invention is accordingly that of providing a film for the surface coating of articles which includes a functionalization in the form of an illumination or the sending of optical signals by means of which it is possible to integrate into a surface material a decorative effect illumination or light pattern display and which also has a high efficiency based on the ratio of light input or supply to light output/luminosity.

This problem is solved by the features of the main claim. Further advantageous embodiments are disclosed in the subclaims.

Arranged on the back side of the top layer is an optical layer, which has light-transmitting, light-refracting and light-reflecting properties or a combination thereof, i.e. is optically active/has optical properties. The transmission, refraction and reflection properties are such that illumination of the optical layer, in particular back side illumination of the optical layer, results in light transmission, preferably uniform light transmission, through the top layer. The term "uniform" is here to be understood as meaning that, with regard to a certain surface region, illumination of equal intensity of the top layer and uniform light emission from the top layer, are achieved.

It will be appreciated that the optical properties of the optical layer may also be established such that illumination of varying intensity/light emission from the top layer of varying intensity is achieved over certain surface regions. This makes it possible to establish a wave structure or other decorative embodiments of the illumination for example.

Illumination of the optical layer may be achieved either via for example light emitting diodes from the back side, or else by glass fibers from the side or from the back side, but in any case in such a way that light enters into the optical layer and is therein conducted in a diffuse or directed manner according to the properties of said layer so that in combination with the top layer the latter is illuminated/transmits light and appears translucent, transparent or autoluminous from the outside. Accordingly, the entire component upon which the multilayer composite film is arranged as the surface coating may be used as a lighting element or signalling element and may be switched on or off as desired.

The concept underlying the technical solution is thus not only that a light-permeable layer, here the top layer, is transilluminated on the back side but also that a further optical layer is placed behind the layer to be transilluminated which as a result of its special optical properties has the result that a particular and pleasant light distribution and transillumination of the outer top layer is ultimately achieved.

The invention is substantially directed to flexible multilayer composite films made of plastic which in their composite structure typically also contain a foam layer or are foam-backed to achieve a pleasant "feel". It will be appreciated that such light-permeable flexible films are already suitable as a surface coating of an article for the mere fact that their flexibility allows them to adapt to all possible surface configurations and three-dimensional designs of an article when they are for example adhesively bonded to the surfaces of articles. However it will also be appreciated that more or less rigid or inflexible films which for instance themselves already form a type of molded article may also have the inventive structure comprising an optical film backing.

The optical layer is preferably made of a substantially glass-clear or translucent polyethylene terephthalate (PET), which depending on the processing conditions is producible as a semicrystalline (PET-C) or amorphous polyethylene terephthalate (PET-A). Provided clouding through excessive crystallinity is avoided, this affords not only very good optical properties but also, depending on the addition of plasticizer, thickness and configuration, a flexible layer which may be readily combined, laminated and further processed with further plastic layers.

In one advantageous development the optical layer has had discontinuities/irregularities introduced into the material or into the structure of the layer to influence or alter transmission, refraction and reflection properties. In the case of an optical layer of PET it is possible to influence or alter the degree of crystallization/the crosslinking or polymerization in the layer material at certain points or areas through energy input, for example by irradiation with a laser of suitable frequency. For an amorphous PET it is thus possible through such material influencing to alter any transmission properties present in the direction of enhanced refraction or reflection properties. Finally, with appropriate treatment the optical layer may serve to conduct incident light into the top layer in highly diffuse form, for example.

In a further advantageous embodiment regions or structures having different reflection or refraction properties compared to the remaining material may be formed, preferably through material consolidations, material alterations or material deformations in or on the interfaces/surfaces of the optical layer. Thus for example surface regions of the optical layer may have wave structures, periodic or repeating density alterations similar to a Fresnel lens or may be provided with a fluting or knurling having appropriate macroscopic dimensions. Although it is appreciated that the term "macroscopic" is per se relative in many technical fields this term is understood to encompass orders of magnitude which, while small, are still visible to the naked eye.

In a further advantageous embodiment at least one of the interfaces/surfaces of the optical layer is provided with an optically active embossing, preferably rather with projections, toothings, or grainings. Such an embossing may be carried out on one side or on both sides so that incident light and transmitted light may be appropriately influenced.

In a further advantageous embodiment the partially light-permeable/transparent top layer has a texture or a relief, wherein in a multiplicity of subregions or surface points the top layer is reduced down to a residual layer thickness. In the art such a surface character or finish is referred to as "semi-perforation" and is likewise preferably carried out by embossing. This comprises treating the top layer with appropriately configured embossing tools or pinwheels, for example with circular or rhombic needle tips, so as to form a type of hole pattern with holes that do not extend through the total thickness of the top layer and externally or in section are roughly comparable to blind holes. Semi-perforation or decorative perforation thus describes the impression of a perforation, but without any actual perforation of the surface or of the surface material. This impression may be amplified by coloring/pigmenting the film or through a color printing technique in which the film base material has a lighter colored or more translucent color tone than the surface print which does not extend into the depressions. The reduced layer thickness of the top layer in the holes in any case has the result that the transmission of light from the optical film therebehind is substantially more intense as a result of these "thinned residual layers" than in the non-thinned regions. The hole pattern—thus appears to the observer as a translucent light pattern.

In a further advantageous embodiment—similarly to the measures already described above in the optical layer—the transmission, refraction and reflection properties in the top layer too may be altered or influenced through introduction of discontinuities/irregularities into the top layer in the material or in its structure. Here too the material of the top layer may be influenced on a region-by-region or point-by-point basis for example by irradiation with a laser of a suitable frequency.

In a further advantageous embodiment the top layer is perforated, preferably provided with linear or areal perforation patterns. This makes it possible to very easily create decorative patterns by for example performing a linear perforation such that letters, pictograms or pictures are formed. One example of such a decorative pattern is a multilayer composite film for a vehicle headlining in which the patterns of constellations are introduced into the top layer by perforation.

In a further advantageous and easy to produce embodiment the top layer consists substantially of a thermoplastic polyolefin. Such top layers are for example very easy to produce by film-insert molding of a grained TPO film.

In a further advantageous embodiment the top layer comprises a top coat of polyvinyl chloride (PVC) and a foam coat arranged on the back of the top coat. This makes it possible to achieve different embodiments of "haptics" and tactile feel in very simple fashion.

It will be appreciated that the list of these materials is not to be understood as exhaustive. In addition to TPO or PVC other materials such as for instance polyurethane (PUR) or various hybrid forms may also be used as top layers. The number of layers which together with the optical layer are combined to form a laminate/a layer composite film is also not stipulated. What is essential in all of these constructions is that the underlying general solution concept is retained, namely that at least one optical layer whose optical properties improve the translucency or transparency of the overall layer package is always present.

Such multilayer composite films are particularly advantageously employable as interior trim parts for vehicles, wherein the interior trim part comprises a carrier on the outside of which the light-permeable multilayer composite film according to the invention is provided. A dashboard for example can thus very easily be provided with such a multilayer composite film. In this case a light source is arranged between the carrier and the multilayer composite film, preferably one or more LED lights arranged in a sheetlike or ribbonlike configuration. These lights may either be arranged at a distance from the rear of the optical film, i.e. for instance on a grid of appropriate height arranged on the back side of the optical film, or it may be secured directly to the back side of the optical film. It will be appreciated that light guides may be used here too and these may either shine directly into the optical film from the side or from behind or may likewise be arranged at a distance from the back side of the optical film.

It is equally advantageous to design any type of furniture having a light-permeable multilayer composite film arranged on its outside, wherein here too for example one of the abovementioned light sources is arranged between the carrier and the multilayer composite film at a distance or in direct contact with the optical film.

Figure 2:
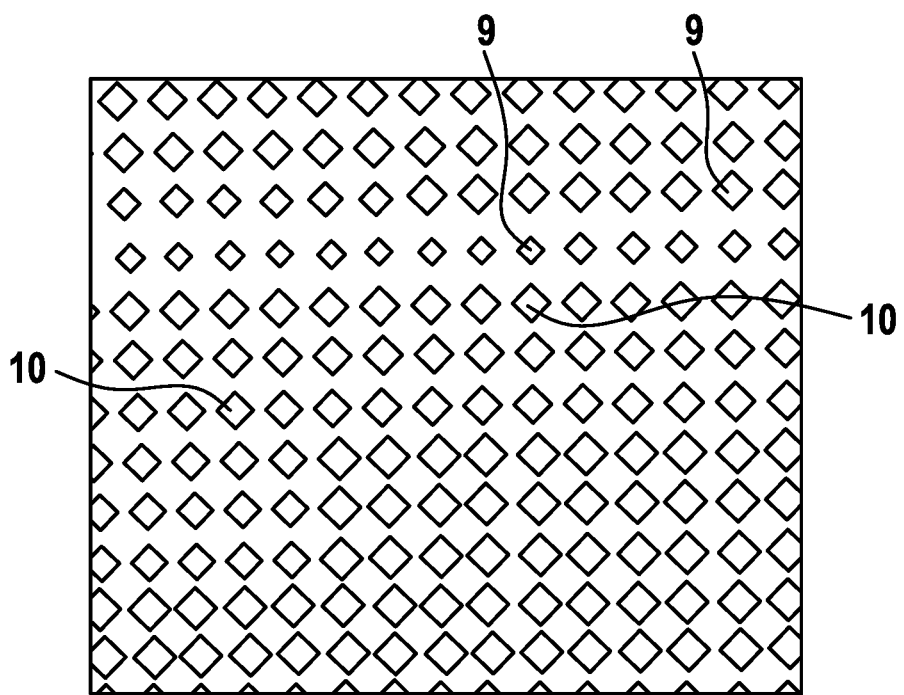
Figure 3:
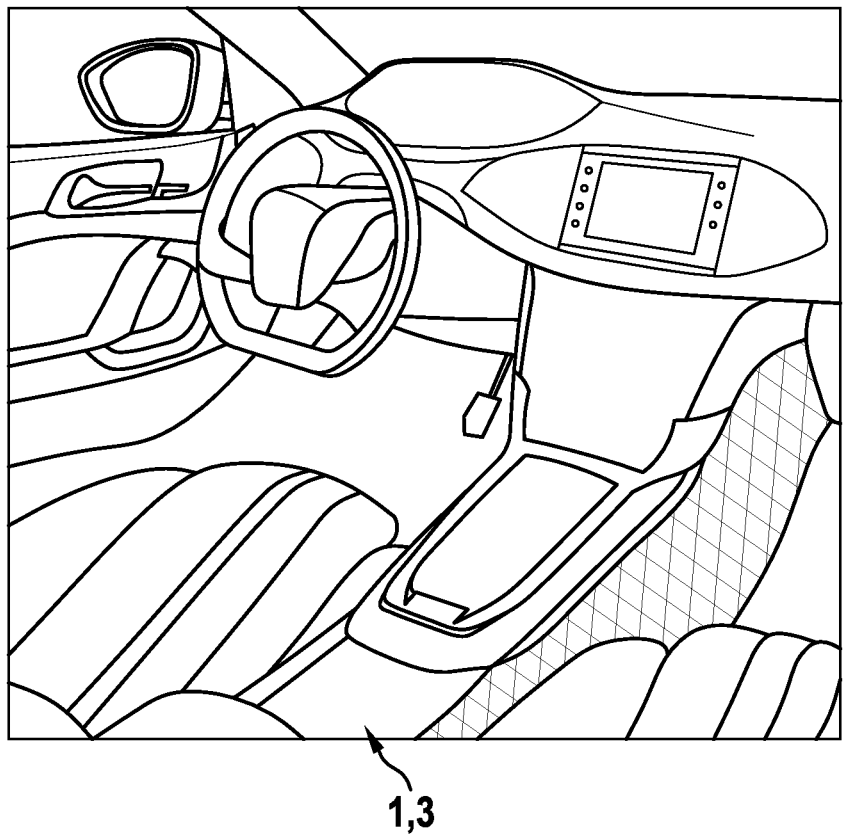
Figure 4:
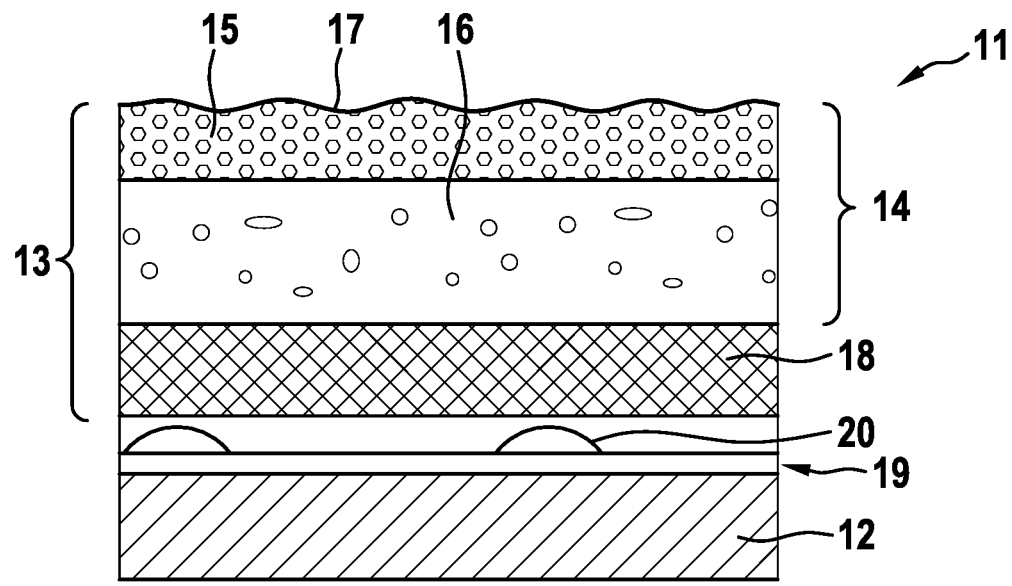

The invention will be explained in more detail with reference to an exemplary embodiment. In the drawings:

FIG. 1 Shows a section of a motor vehicle interior trim part which is provided with a multilayered composite film according to the invention having a TPO top layer, FIG. 2 Shows a plan view and an enlargement of the top layer 4, FIG. 3 Shows an arrangement of a interior trim part according to the invention in a vehicle, FIG. 4 Shows a section of another interior trim part for a vehicle which is provided with a multilayer composite film according to the invention which comprises as a top layer a top coat and, arranged on the back of the top coat, a foam coat made of PVC.

FIG. 1 shows a section of an interior trim part 1 for a center console for a motor vehicle, wherein the interior trim part is provided with a multilayer composite film 3 according to the invention.

This interior trim part comprises a carrier 2 on the outside of which is arranged a multilayer composite film 3 whose top layer 4 consists substantially of a thermoplastic polyolefin (TPO). The composite film is provided on its outside with a transparent lacquer 5, wherein the top layer 4 is in turn likewise transparent, namely partially light-permeable. In this context partially light-permeable is to be understood as meaning that the top layer 4 does not behave like virtually completely light-permeable glass but rather transmits a certain percentage of the light incident on its back side and reflects or absorbs a further percentage.

Arranged on the back side of the top layer is an optical layer 6 is, namely an optical layer made of PET, which has a combination of optical properties, namely light-transmitting, light-refracting and light-reflecting properties but here substantially transmits light. These transmission, refraction and reflection properties are such that back side illumination of the optical layer 6 results in light transmission also through the partially light-permeable top layer 4.

Provided between the carrier 2 and the multilayer composite film 3 is a light source 7 composed of a plurality of LED lights 8 arranged on conducting tapes which are arranged at regular intervals over a certain surface area of the carrier 2 and directly adjacent to the optical layer 6.

Discontinuities in the material (not shown in detail) have been introduced into the material in the optical layer and especially influence the light-transmitting property of the optical layer 6 in the form of a PET layer in such a way that the optical layer conducts incident light into the top layer 4 in highly diffuse form. This results in a wide and uniform distribution of the light within the optical layer and thus also with regard to the transillumination of the top layer 4 with the light from the LED lights 8. Although discrete LED lighting elements are present, transillumination of the top layer which appears uniform and opaque is achieved.

FIG. 2 shows in the form of a plan view and an enlargement the top layer 4 which is partially light-permeable and also has a texture. In this case, the top layer has been reduced down to a residual layer thickness in a multiplicity of subregions or surface points, i.e., as explained hereinabove, provided with a "semi-perforation" produced by embossing.

The top layer has here been provided with a multiplicity of rhombic stampings or depressions 9, 10 of different sizes, each having a base area of 1 to 2 mm$^2$, thus creating a pattern comprising blind holes that do not extend through the total thickness of the top layer. It will be appreciated that the rhombic shape is only one of many possible embodiments of stampings, and circular, elongate or oval stampings or a mixture thereof may be introduced just as readily.

The reduced layer thickness of the top layer in the holes then has the result that the transmission of the light from the optical film therebehind is substantially more intense as a result of these "thinned residual layers" than in the non-thinned regions, though the top layer still gives an overall impression of being opaque. The hole pattern thus appears to the observer as a uniformly shimmering, translucent light pattern.

FIG. 3 shows by way of example the arrangement of the interior trim piece 1 provided with a TPO-based translucent composite film 3 according to the invention in a vehicle. The illuminated outer surface of the cockpit center console allows not only for lighting with great effect but also for the driver to be given signals that increase safety in road traffic.

FIG. 4 shows a section of a further interior trim part 11 for a vehicle provided with a multilayer composite film 13 according to the invention whose top layer 14 comprises a top coat 15, i.e a top layer made of PVC and a PVC foam coat 16 arranged on the back side of the top coat.

The interior trim piece has a carrier 12 on the outside of which the multilayer composite film 13 is provided. The composite film is provided on its outside with a transparent lacquer 17. Arranged on the back side of the top layers 14, i.e. on the back side of the foam coat 16, is an optical layer 18 such as has already been described under FIG. 1 in the above exemplary embodiment of a TPO top layer. The transmission, refraction and reflection properties are such that back side illumination of the optical layer 18 results in light transmission also through the partially light-permeable top layers 14, i.e. through the top coat 15 and the foam coat 16.

Arranged between the carrier 12 and the multilayer composite film 13 is a light source 19 composed of a plurality of LED lights 20 arranged in a sheet like configuration on conducting tapes which are arranged at regular intervals over a certain area of the carrier 12 and directly adjacent to the optical layer 18.

LIST OF REFERENCE NUMERALS

Part of the Description

1 Interior trim piece
2 Carrier
3 Multilayer composite film
4 Top layer
5 Lacquer
6 Optical layer
7 Light source
8 LED light
9 Rhombic depression (blind hole)
10 Rhombic depression (blind hole)
11 Interior trim piece 12 Carrier
13 Multilayer composite film
14 Top layer
15 Top coat
16 Foam coat
17 Lacquer
18 Optical layer
19 Light source
20 LED light

The invention claimed is:

1. A light-permeable multilayer composite film made of plastic as a surface coating of an article, wherein the composite film comprises at least one outer, at least partially light-permeable top layer optionally provided with a lacquer and at least one further layer arranged on a back side of the top layer;
   wherein arranged on the back side of the top layer is at least one optical layer made of polyethylene terephthalate (PET) which has one or more of light-transmitting, light-refracting and light-reflecting properties, or a combination thereof;
   wherein the transmission, refraction and/or reflection properties are such that illumination of the optical layer results in uniformized light transmission through the top layer;
   wherein discontinuities/irregularities are introduced into the optical layer.

2. The light-permeable multilayer composite film as claimed in claim 1, wherein discontinuities/irregularities are introduced into a structure of the optical layer which influence or alter the transmission, refraction and/or reflection properties.

3. The light-permeable multilayered composite film as claimed in claim 1, wherein regions or structures having different reflection or refraction properties compared to the remaining material are formed, through material consolidations, material alterations or material deformations in or on interfaces/surfaces of the optical layer.

4. The light-permeable multilayered composite film as claimed in claim 1, wherein at least one of interfaces/surfaces of the optical layer is provided with an optically active embossing with projections, toothings, or grainings.

5. The light-permeable multilayer composite film as claimed in claim 1, wherein the top layer has a textured or relieved surface, and wherein in a multiplicity of subregions or surface points, the top layer is reduced down to a residual layer thickness.

6. The light-permeable multilayer composite film as claimed in claim 1, wherein the top layer comprises discontinuities/irregularities in the material or in its structure which alter the transmission, refraction and/or reflection properties of the top layer.

7. The light-permeable multilayer composite film as claimed in claim 1, wherein the top layer is perforated with linear or areal perforation patterns.

8. The light-permeable multilayer composite as claimed in claim 1, wherein the top layer consists substantially of a thermoplastic polyolefin (TPO).

9. The light-permeable multilayer composite film as claimed in claim 1, wherein the top layer comprises a top coat made of polyvinyl chloride (PVC) and, arranged on the back of the top coat, a foam coat made of PVC.

* * * * *